Aug. 2, 1966  H. A. McILVAINE  3,264,119
METHOD OF FORMING A CITRUS FRUIT SHELL CONTAINER
Filed Jan. 4, 1963

INVENTOR.
HUBERT A. McILVAINE,
BY
Brown, Adams, Benedict, Swecker & Mathis
ATTORNEYS

United States Patent Office 3,264,119
Patented August 2, 1966

3,264,119
METHOD OF FORMING A CITRUS FRUIT SHELL CONTAINER
Hubert A. McIlvaine, 418 Austin St., Geneva, Ill.
Filed Jan. 4, 1963, Ser. No. 249,468
2 Claims. (Cl. 99—171)

It has been recognized heretofore that a large quantity of citrus fruit ripens on the tree before picking to such an extent that it is unsuitable for shipment to remote points for sale as natural fruit. Attempts have been made heretofore to utilize such fruit through the manufacture of marmalade and other citrus products including livestock food, but only to a very limited extent. An insufficient quantity of citrus fruit can be used in these ways, due largely to the lack of an effectively preserved product which will withstand shipment and storage while maintaining a complete sealing of the contents.

One object of this invention is to improve the construction of the fruit container so as to utilize the hull or outer skin of the citrus fruit as a container and yet provide therefrom an effectively sealed and preserved and readily eatable product.

Another object of the invention is to improve the method of preparing the container from the hull or outer skin of citrus fruit so that an effective container is provided which will maintain its sealing effect and preserved condition.

These objects may be accomplished by using a complete citrus fruit product, such as an orange or grapefruit, which is cooked in a sugar solution to preserve effectively the skin. The contents are removed and used for making marmalade or other product and a food product is then introduced into the preserved hull and sealed preferably by the application of the removed cap or section of the hull. The resultant product is attractive and can be transported or shipped or stored as found desirable.

The invention is applicable to many different types of edible food products, and while it is not intended to be limited to citrus fruit, it is described in connection therewith because such fruit is available in substantial quantities. The fruit used is preferably of uniform size and quality, although it is preferred that it be tree ripened not only because tree ripened fruit is more often available and at lower cost, but also inasmuch as it is unsuitable for shipment to remote points as fresh fruit. The process is described in connection with a grapefruit, merely as an example of the citrus fruit or other fruit that may be used in connection with this invention.

Figure 2:
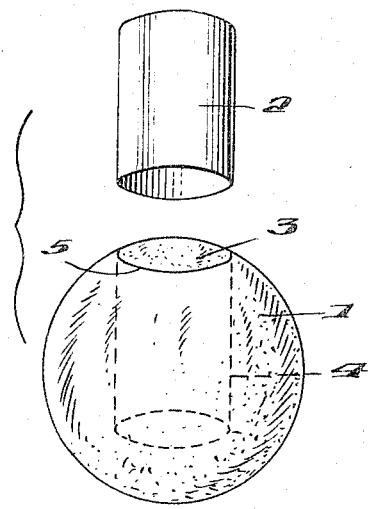
FIG. 2 is a perspective view of a citrus product in course of preparation, and showing one method of cutting the hull.

The first step after the selection of the fruit, is to apply an abrading action to the outside surface of the grapefruit, just deep enough to break the oil cells on the surface and around the body of the fruit, leaving a space unground at the top and bottom which would correspond with the blossom and stem ends of the fruit. In FIG. 2, the shell of the fruit is indicated generally by the numeral 1 and the stippled area indicated thereon is the portion that would be ground in the manner described.

A cylindrical or tube-shaped cutter 2 may be inserted axially of the core of the fruit at one end thereof, either the stem or blossom end, and cuts around the core and around a cap 3 in the end of the hull, the severed portion of the core being indicated generally at 4 in FIG. 2. The cutter 2 is inserted down at least three-fourths of the way towards the opposite end, but without cutting through the latter, thus forming a cut extending through the hull, the severed portion being indicated at 5 in FIG. 2 in the hull and through the cut portion 4 in the body of fruit, to permit the boiling water and solution to pass freely into the hull.

Instead of cutting the shell at one end, as described, the shell can be cut in half. These half sections then can be treated as described, after which they can be sealed together.

The individual fruit, thus prepared, can be put into a vat or vessel of water and boiled to an extent sufficient to cook the fruit thoroughly. A large vessel can be used and a substantial quantity of fruit cooked at one time over a period of time sufficient for the purpose. The length of time of cooking will vary according to the different types and conditions of fruit, but should be sufficient so that the interior can be removed readily.

Thereafter, the individual fruit products can be removed from the cooking solution and cooled sufficiently for handling. Then the shells are cleaned out. The cap 3 and severed core 4 are removed. The entire interior of the grapefruit should also be removed and saved for marmalade or other food product. The pulp, and any of the hulls that are not useable for this purpose, have many other uses, including livestock food. Care should be exercised in this operation to avoid breakage or rupturing of the hull.

Figure 3:
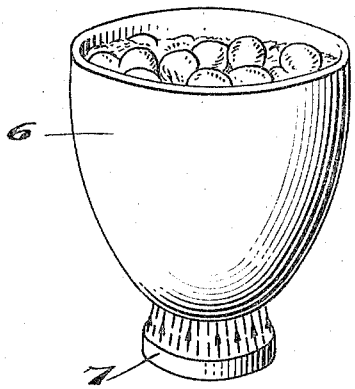
FIG. 3 is a perspective view showing the cooking step of the process.

In FIG. 3, I have illustrated at 6 a large vessel that may be used for cooking the fruit. While any suitable heating means found desirable for the purpose may be employed, a burner is shown at 7 for maintaining the heating of the water or solution during the cooking operation. This vessel 6 may be employed both for the cooking in water and for the cooking in sugar solution, if desired, or separate similar vessels used for the respective operations.

After the treatment of the hulls as described, these are placed in a kettle or vessel such, for example, as that illustrated at 6 in FIG. 3 in a sugar solution for preserving the hulls. The hulls should be submerged effectively in the sugar solution so as to be coated on all sides therewith inside and out, and this is continued until they reach an effectively conserved condition.

While the character of the sugar solution can be changed as desired, I have found that a solution comprising 4 gallons of water and 100 lbs. of cane sugar (sucrose) serves effectively for the purpose. While other sugar solutions can be used, effective for the purpose, I prefer to use cane sugar ($C_{12}H_{22}O_{11}$).

When the shells are cooked in this solution, they are effectively preserved but sufficiently firm on the outside as to have a maintained life suitable for transportation and for storage. The inside of the shell should be relatively soft.

I have also found that the addition of corn syrup to the sugar solution improves the character of the product. It prevents the hardening of the inside of the shell, somewhat resembling a jelly bean, or jelly-like consistency so as to be readily eatable. When dried, the outer film of the shell is reasonably firm, but the main body thereof inside of the outer surface is relatively soft, even when stored over a long period of time. The corn syrup can be applied in the form of dextrose sugar ($C_6H_{12}O_6H_2O$) and should be used in an amount of approximately 10% of the total sugar content in the solution.

The shell can be improved, further, by rubbing cane sugar on the outside of the completed shell which makes a thin layer of hardened shell on the surface and yet the inside is soft and readily eatable.

After thus cooking the shells in a sugar solution, as described, these are removed, drained and dried under controlled temperature conditions for a sufficient length of time to be in the desired condition. The cap sections 3 should be cooked in the sugar solution along with the shell, so as to be preserved and usable for sealing the shells.

Thereafter, the shells can be filled with any suitable food product, such as jelly, marmalade, fruit juice, frozen foods, etc. Then the cap section 3 is applied over the opening in the shell thus filled and sealed around the edges of the cap by a suitable sealing material which may comprise a sugar sealing material or other product suitable for the purpose. The cap can be dipped, if desired, in a hot bath of paraffin to aid in the sealing thereof.

Figure 1:
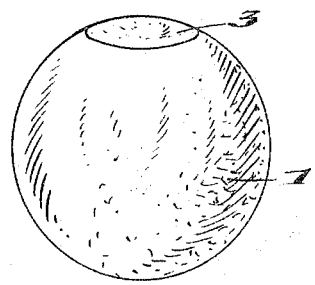
FIG. 1 is a perspective view showing a food container prepared according to and embodying this invention.

The finished product is illustrated generally in FIG. 1 and forms an effective food container that is effectively preserved and may be handled, shipped or stored for containing foods of many different types. If filled with frozen products, such as orange juice or other citrus juices, or any other frozen food, the shells can be frozen and stored in the manner of handling such frozen foods. Any remaining syrup can be bottled and sold separately.

Figure 4:
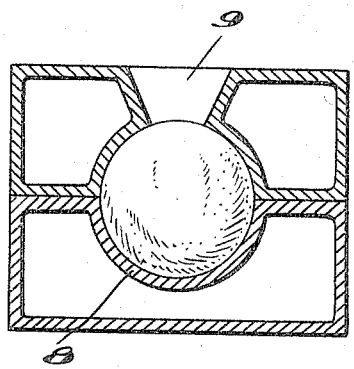
FIG. 4 is a sectional view of a mold usable in molding portions of the product.

If desired, the shell can be inserted in a mold, such as that generally illustrated at 8 in FIG. 4, where after cooking, as described, the formed shell is introduced into the mold and then expanded or shaped therein as by the application of air, to provide and maintain a suitable uniform size and, if desired, to form letters in the periphery thereof. The cap may also be molded so as to fit accurately in the opening formed in the shell.

By inserting the treated shell into the mold, it may be filled while still retained in the mold as, for example, by introducing hot marmalade or other food product through the gate 9 formed in the mold, as shown in FIG. 4.

The mold 8 can be used also for molding ground up, raw or cooked shells which are introduced and formed in the mold and may be cooked therein, thus producing a food container from portions of the fruit that would not otherwise be suitable for use. Crushed shells or the entire citrus fruit product is ground up to the desired extent and formed or cooked in the mold. It is preferred, however, that the entire citrus product or the broken shells be cooked in the sugar solution, preferably with corn syrup added, as described above. Then these products can be ground up and molded as herein described. The ground or pulverized citrus shell or pulp may be shaped in the mold over a suitable core or by expanding pneumatically or hydraulically. The molded product may be sealed also as described above.

The complete food container, as shown in FIG. 1 or in FIG. 4, may be packaged in any manner that is found desirable. It is preferred that it be enclosed in a transparent plastic sheet, such as waterproof cellophane, to protect the container. The coating material may be sprayed over the formed food container, if desired, and will thereby effectively adhere to the surface, but if the sheet be wrapped around or folded over, the edges may be brought together under a suitable seal.

While the invention has been illustrated and described in certain embodiments, it is recognized that variations and changes may be made therein, without departing from the invention as set forth in the claims.

I claim:

1. A method of forming a food container from the shell of citrus fruit comprising cooking the shell in a sugar solution to an extent that will conserve the fruit, thereafter introducing the shell into a mold and expanding the shell in the mold to conform thereto.

2. A method of forming a food container from the shell of citrus fruit comprising cooking the shell in a sugar solution to an extent that will conserve the fruit, thereafter introducing the shell into a mold and expanding the shell in the mold to conform thereto, and introducing a food product into the shell in the mold and sealing the shell.

References Cited by the Examiner

UNITED STATES PATENTS

| | | | |
|---|---|---|---|
| 1,906,295 | 5/1933 | Wickenden | 99—102 |
| 1,980,013 | 11/1934 | Stott | 99—102 |
| 2,038,584 | 4/1936 | McIlvaine | 99—181 |
| 2,156,145 | 4/1939 | Cavett et al. | 99—88 X |
| 2,707,153 | 4/1955 | Bettman | 99—138 X |
| 2,769,206 | 11/1956 | Cheney et al. | 99—171 X |
| 2,878,154 | 3/1959 | Cheney et al. | 99—171 X |

FOREIGN PATENTS 474,396  11/1937  Great Britain.

OTHER REFERENCES

Lord: "Everybody's Cookbook," 1937, Harcourt Brace and Co., New York, pp. 186, 767.

Farmer: "The Boston Cooking-School Cook Book," Ninth Ed., 1951, Little, Brown and Co., Boston, p. 751.

A. LOUIS MONACELL, *Primary Examiner.*

BEATRICE H. STRIZAK, *Examiner.*

J. M. GOLIAN, *Assistant Examiner.*